United States Patent [19]

Tanino et al.

[11] Patent Number: 4,718,714
[45] Date of Patent: Jan. 12, 1988

[54] VEHICLE SUPPORT STRUCTURE FOR A DETACHABLE ROOF

[75] Inventors: Masaharu Tanino; Masaru Ogiso, both of Toyota, Japan

[73] Assignee: Toyota Jidosha Kabushiki Kaisha, Japan

[21] Appl. No.: 27,996

[22] Filed: Mar. 17, 1987

Related U.S. Application Data

[63] Continuation of Ser. No. 808,657, Dec. 13, 1985, abandoned.

[30] Foreign Application Priority Data

Dec. 14, 1984 [JP] Japan .................. 59-189981

[51] Int. Cl.$^4$ .................. B60R 13/02; B60J 7/11
[52] U.S. Cl. .................. 296/214; 296/218; 52/222
[58] Field of Search .............. 296/214, 216, 218, 224; 52/222, 511, 804, 805; 24/293, 294, 297

[56] References Cited

U.S. PATENT DOCUMENTS

| | | | |
|---|---|---|---|
| 2,018,640 | 10/1935 | Johnsen | 52/511 |
| 3,097,015 | 7/1963 | Nagel | 296/214 |
| 4,188,440 | 2/1980 | Doerer | 296/214 X |
| 4,312,533 | 1/1982 | Jardin et al. | 296/214 |

FOREIGN PATENT DOCUMENTS

| | | | |
|---|---|---|---|
| 2549503 | 5/1977 | Fed. Rep. of Germany | 52/222 |
| 3047463 | 9/1981 | Fed. Rep. of Germany | 296/224 |
| 161579 | 4/1981 | Japan | |
| 191169 | 11/1982 | Japan | 296/214 |

Primary Examiner—Dennis H. Pedder
Attorney, Agent, or Firm—Finnegan, Henderson, Farabow, Garrett & Dunner

[57] ABSTRACT

A vehicle support structure for a detachable roof includes a roof panel extends along an exterior portion of the vehicle and includes a recessed frame having an upper support surface. A sealing member is positioned along the upper support surface for providing weather sealing along the roof panel and the detachable roof when the detachable roof is closed. A liner extends beneath the roof panel for lining at least a portion of the interior of the vehicle. The liner has a support base spaced from the roof panel, as well as at least one lining pad having an end section secured along the recessed frame. An inner panel member is aligned with at least a portion of the support base and extends between the support base and the recessed frame. A clamping member is secured to the inner panel member and contacts the end section for resiliently retaining the end section in engagement with the recessed frame. The clamping member includes an irregularly-shaped plate, together with a screw member, for securing the plate to the inner panel member. The plate configuration defines an expanded channel between the plate and the recessed frame for receiving the end section and for securely holding the end section along the recessed frame.

7 Claims, 2 Drawing Figures

VEHICLE SUPPORT STRUCTURE FOR A DETACHABLE ROOF

This application is a continuation of application Ser. No. 808,657, filed Dec. 13, 1985, abandoned.

BACKGROUND OF THE INVENTION

This invention relates to improvements in the end handling structure for a roof head in contact with a detachable roof of a vehicle having the roof, such as a targa-top vehicle and the like.

The end of a roof head of this type was heretofore constructed, as disclosed in Japanese Utility Model Laid-open No. 161579/1982, to coat the end of the lining of the roof head with its skin to improve the external appearance of the end of the roof head and to omit an additional component such as a garnish.

However, the abovementioned conventional end handling structure is formed merely by bending the end of the lining of the roof head or coating it with a body component such as a weather strip. Therefore, there arises a drawback that, when an external force is applied to the end of the roof head, the end is commonly torn up.

SUMMARY OF THE INVENTION

It is, accordingly, an object of this invention to provide an end handling structure for a roof head which can eliminate the abovementioned drawbacks and disadvantages, does not externally expose the end of the lining of the roof head, and can prevent the lining from being removed due to an external force.

In order to obviate the above-described drawbacks and the disadvantages, there is provided according to this invention an end handling structure for a roof head contacting a detachable roof for a vehicle, which comprises a body weather strip provided on the upper surface of a body outer panel at the end of the roof head, a leaf spring-shaped pressing member fixedly secured to a body inner panel to allow the end of the member to effect a pressurizing force toward the lower surface of the body outer panel, and a roof head lining inserted at the bent end thereof between the end of the pressing member and the lower surface of the body outer panel at the end of the roof head.

The end of the lining of the roof head is thus bent, and fixedly secured toward the lower surface of the body outer panel. Thus, the end of the lining is not externally exposed.

Further, the end of the lining of the roof head is fixedly secured by utilizing a pressurizing force of the leaf spring-shaped pressing member effected toward the lower surface of the body outer panel. In addition, the pressing member can absorb an impact force applied from a weather strip when attaching or detaching the detachable roof to prevent the lining from being removed due to an external force.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENT

Figure 1:
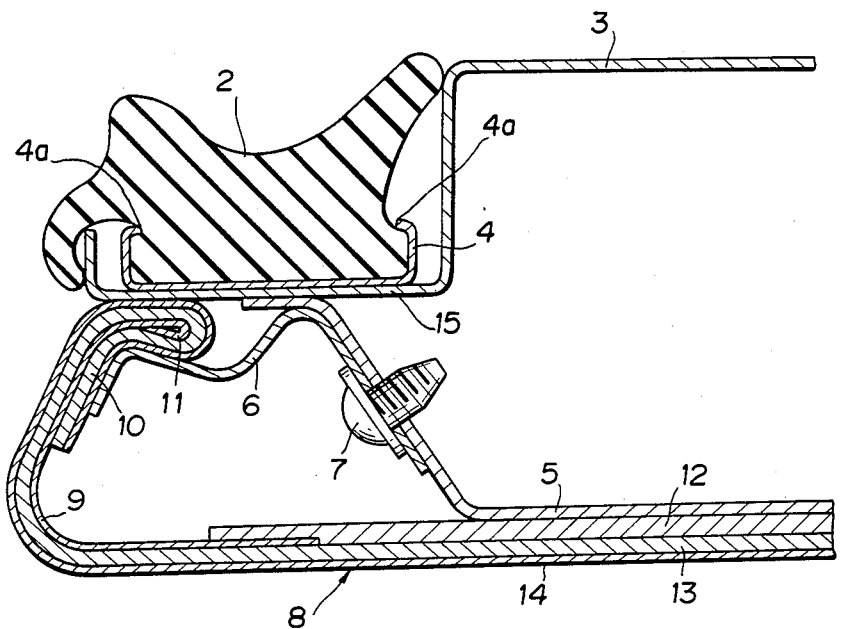
FIG. 1 is a longitudinal sectional view showing an embodiment of the end handling structure of a roof head according to this invention.
Figure 2:
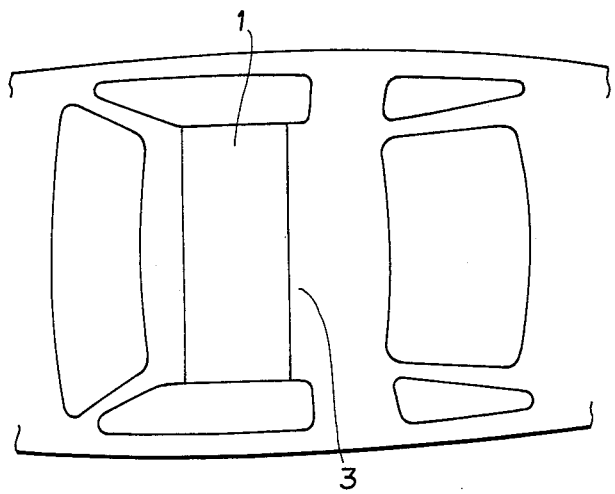
FIG. 2 is a plan view showing the outer surface of the roof of a targa-top vehicle.

This invention will now be described in detail reference to FIGS. 1 and 2, which show an embodiment of the end handling structure of a roof head according to this invention. In FIG. 2, reference numeral 1 designates a detachable roof of a targa-top vehicle. In FIG. 1, reference numeral 2 designates a body weather strip contacting the rear edge of the detachable roof 1.

Sealing means, such as body weather strip 2, is fixedly secured through retention means 4a, i.e. the opposite U-shaped sectional ends of a fixing member 4, onto the upper surface of the recessed end of a body outer panel 3 at the side end of the roof head in such a manner that the opposite two projections of the body weather strip 2 are engaged with the U-shaped ends of the fixing member 4. The body outer panel 3 is thus formed at the side end thereof with a recessed frame 15 at the side end of the roof head so as not to disturb the attachment of the detachable roof 1.

A body inner panel 5 at the end of the roof head is bent upwardly to form a bent straight intermediate end portion and further bent at the further end toward the horizontal direction, and fixedly secured at the horizontal further end integrally to the lower surface of the recessed end of the outer panel 3. Further, a leaf spring-shaped pressing member or clamping means 6 is clamped at one inner end via a screw 7 to the bent straight intermediate end portion. The pressing member 6 made of a thin steel plate is also bent substantially in an M-shape in section, and so clamped by the screw 7 that the first crest of the M-shaped section thereof may exert a pressurizing force to the lower surface of the recessed end of the outer panel 3 through the end of the inner panel 5. The pressing members 6 are prepared in a large number, and mounted at a predetermined interval on the inner panel 5.

In addition, lining means including a roof head lining 8 at the side end of the roof head is bonded on the inner surface thereof with a head lining forming base material 9 and bent and formed substantially in U shape integrally with the base material 9, and further bent and folded at the front end section 10 toward the back surface side of the base material 9 in such a manner that the front end section 10 is inserted between the lower surface of the recessed end 15 of the outer panel 3 and the pressing member 6.

The base material 9 is preferably formed at the end with a projecting strip 11 by hemming or bending, thereby preventing the pressing member 6 from being removed therefrom.

In FIG. 1, reference numeral 12 designates a head lining forming support base material which is thicker than the base material 9, but which may be integrally formed of the same material as the base material 9. Further, reference numeral 13 designates a head lining pad, and numeral 14 designates another lining pad, known as a head lining skin. The head lining forming support base material 12 is disposed between the inner panel 5 and the head lining pad. Further, the inner panel 5 is aligned along a surface of the support base material 5 opposite the head lining pad 13.

In case of handling the end of the roof head, the body weather strip 2 is first mounted on the recessed end of the outer panel 3, the pressing member 6 is then secured via the screw 7 to the intermediate horizontal end portion of the inner panel 5, the end of the roof head lining 8 is then bent and folded, and inserted within an expanded channel defined by the pressing member 6 and the outer panel 3 against the pressing force of the pressing member 6 while bending the roof head lining 8. Thus, the roof head lining 8 can be always pressed to the lower surface of the recessed end of the outer panel 3, and the state is maintained.

According to the present invention as described above, since there is provided the end handling structure for a roof head contacting a detachable roof for a vehicle, which comprises a body weather strip provided on the upper surface of a body outer panel at the end of the roof head, a leaf spring-shaped pressing member fixedly secured to a body inner panel to allow the end of the member to effect a pressurizing force toward the lower surface of the body outer panel, and a roof head lining inserted at the bent end thereof between the end of the pressing member and the lower surface of the body outer panel at the end of the roof head, the bent end is always pressurized and held by an adequate force, and the force applied to the bent end is alleviated by the moderating action of the leaf spring-shaped pressing member even if an external force such as an impact force is applied through the body weather strip to the bent end in case of mounting the detachable roof.

Therefore, the end handling structure of the roof head of this invention can preferably prevent the end of the lining from being externally exposed.

Further, even in case of attaching the roof head lining, the end may be bent and inserted satisfactorily against the pressing force of the pressing member, and the end handling structure of the roof head may be very simply and rapidly constructed.

What is claimed is:

1. A vehicle support structure for a detachable roof, comprising:
    a roof panel extending along the vehicle exterior and terminating in a downwardly recessed frame having an upper support surface;
    sealing means positioned within said recessed frame along said upper support surface for providing weather sealing between said roof panel and the detachable roof when the detachable roof is closed;
    lining means extending beneath said roof panel for lining at least a portion of the interior of the vehicle, said lining means having a support base spaced below said recessed frame, said lining means also having an upwardly bent end section secured to a lower surface of said recessed frame;
    an inner panel member aligned along a surface of said support base and extending upwardly between said support base and said recessed frame; and
    clamping means secured to said inner panel member and contacting said end section for resiliently retaining said end section in engagement with said recessed frame.

2. The vehicle support structure defined in claim 1, wherein said sealing means includes flexible weather stripping and said recessed frame includes retention means mounted thereon for affixing said weather stripping to said recessed frame.

3. The vehicle support structure defined in claim 1, wherein said clamping means includes a substantially M-shaped steel and screw means for securing said plate to said inner panel member.

4. The vehicle support structure defined in claim 3, wherein said plate defines an expanded channel for receiving said end section so that said plate securely holds said end section along said recessed frame.

5. The vehicle support structure defined in claim 3, wherein said lining means includes two lining pads being folded along a common end to define a projecting strip along said end section, and wherein said plate defines an expanded channel for receiving and retaining said projecting strip adjacent said recessed frame.

6. The vehicle support structure for a detachable roof as defined in claim 5, wherein said support base is mounted between said inner panel member and said two lining pads.

7. The vehicle support structure for a detachable roof as defined in claim 1, wherein said clamping means includes an irregularly-shaped plate and screw means for securing said plate to said inner panel member, said plate defining an expanded channel between said plate and said recessed frame for receiving said end section, said plate securely holding said end section along said recessed frame.

* * * * *